Figures 4, 5:
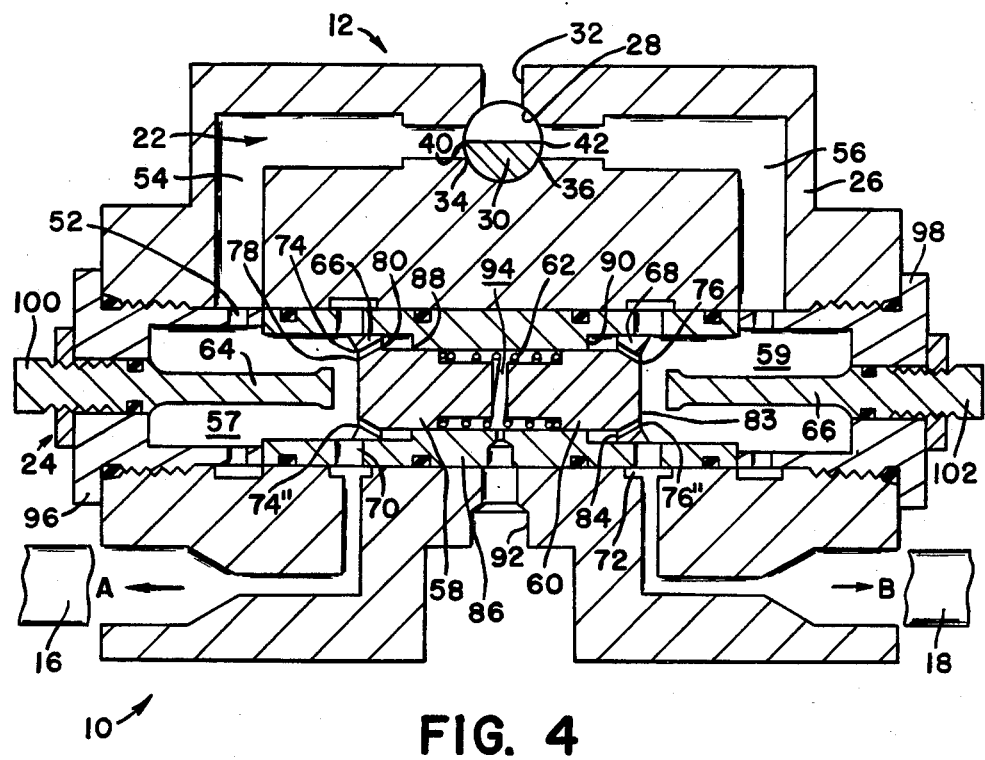

United States Patent [19]
Portolese et al.

[11] Patent Number: 4,691,730
[45] Date of Patent: Sep. 8, 1987

[54] CONSTANT PERCENTAGE FLOW DIVIDER

[75] Inventors: Larry A. Portolese, Granger; Thomas M. Leathers, South Bend, both of Ind.

[73] Assignee: Allied Corporation, Morristown, N.J.

[21] Appl. No.: 909,440

[22] Filed: Sep. 19, 1986

[51] Int. Cl.[4] ............................................. G05D 11/03
[52] U.S. Cl. ............................... 137/101; 137/625.47
[58] Field of Search ............. 137/98, 101, 118, 512.5, 137/625.47

[56] References Cited

U.S. PATENT DOCUMENTS

| | | | |
|---|---|---|---|
| 1,183,544 | 5/1916 | Dittrich | 137/625.47 |
| 1,493,133 | 5/1924 | Sykora | 137/625.47 |
| 2,601,849 | 7/1952 | Lee | 137/118 UX |
| 3,437,103 | 4/1969 | Yoshino | 137/101 UX |
| 3,590,844 | 7/1971 | Ladenzon | 137/101 |
| 4,231,441 | 11/1980 | Burckhardt | 137/101 X |
| 4,250,909 | 2/1981 | Adams | 137/101 |
| 4,325,400 | 4/1982 | Wynne | 137/101 |

Primary Examiner—Robert G. Nilson
Attorney, Agent, or Firm—Leo H. McCormick, Jr.; Ken C. Decker

[57] ABSTRACT

A flow control device (12) for supplying first and second fluid distribution systems (16 and 18) with a constant percentage of fluid flowing from a single source of fluid (14). A housing (20) has a first bore (28) and a second bore (52) with a semi-cylindrical shaft (38) located in the first bore (28) to establish the relationship between fluid flow from an inlet orifice (32) and first and second outlet orifices (34 and 36). A shuttle valve (58-60) in the second bore (52) responds to the fluid flow from the first and second outlet orifices (34 and 36) and the respective back pressure to maintain the fluid flow through the first and second fluid distribution systems (16 and 18) in the same volume percentage as set by position of shaft (30) in the first bore (28). The shuttle valve (58-60) also provides a pressurizing function such that a minimum system pressure is required before any fluid flows to the first and second fluid distribution systems (16 and 18).

9 Claims, 5 Drawing Figures

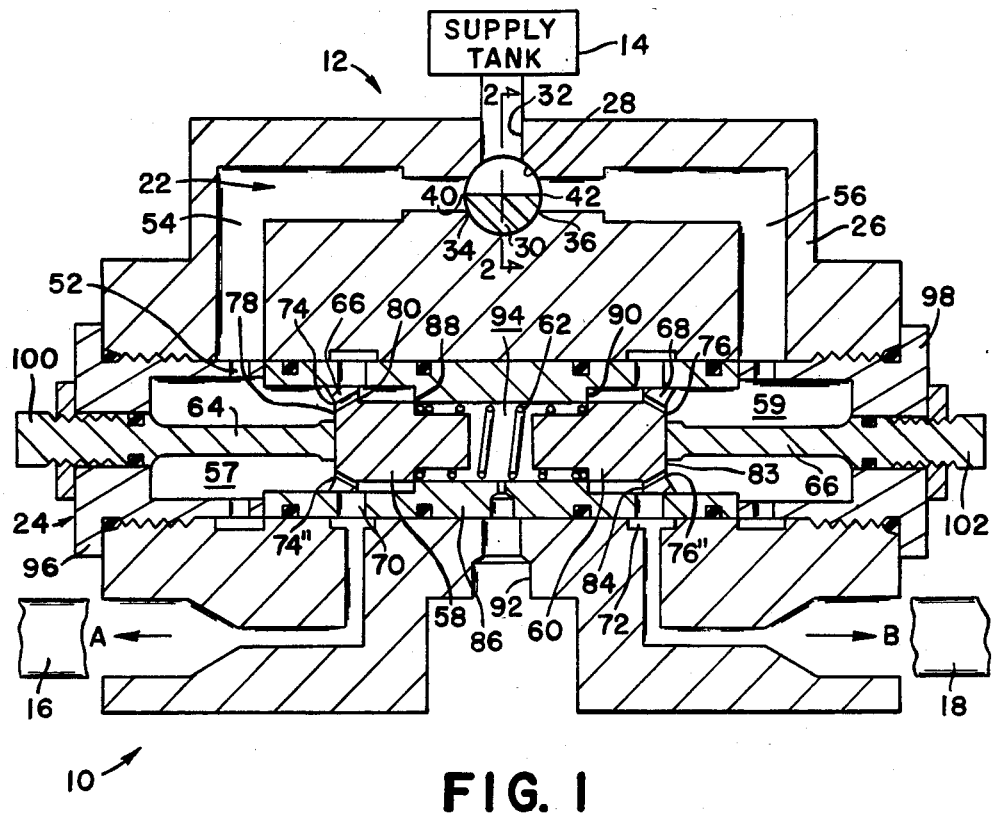
FIG. 1
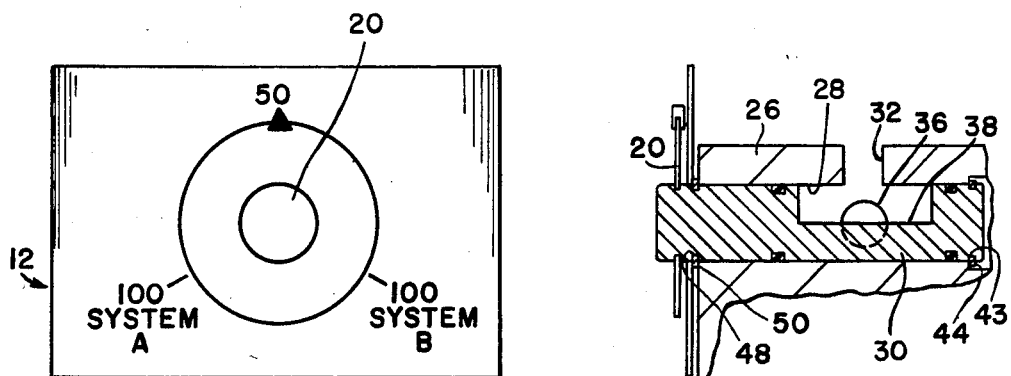
FIG. 3
FIG. 2

CONSTANT PERCENTAGE FLOW DIVIDER

This invention relates to a control device through which first and second distribution systems are supplied with a constant percentage of fluid flowing from a single source.

This invention resulted from a need to be able to split a fluid flow into two separate and parallel flows. It was imperative that the flow be divided in such a manner that the percentage of flow in each system be known and maintained at all times. In order to achieve such a flow relationship, equal pressure of the fluid flowing in the system must be maintained. Existing systems available for providing constant flow division require the the fluid flow in each system to be monitored by a flow meter. An output signal from each flow meter is fed into a computer which provides an input that sequentially moves a splitter until a desired division is achieved. When the desired division is achieved a locking system as disclosed in U.S. Pat. No. 4,043,198 can be implemented to maintain the flow meter in a fixed position.

U.S. Pat. No. 3,390,522 discloses a positive displacement type fuel pump which employs parallel flow of fluid but as typical with this type of apparatus the operating pressures vary in accordance with the fuel requirement at any particular instance.

The control device of the present invention overcomes the complexity of the prior art and yet achieves the desired operational feature of providing separate and parallel flow of fluid over a wide range of inlet flows and back pressure in either flow distribution system.

The control device is made up of two major components: A divider section and a shuttle valve section located in first and second bores in a housing. The divider section includes an inlet orifice and first and second outlet orifices. A shaft with a semi-cylindrical section is located in the first bore and positioned with respect to the first and second outlet orifices such that the same total area is always available for fluid to flow through from the inlet orifice. The total area exposure is achieved since the semi-cylindrical portion of the shaft is positioned such that as much area of one of the first and second outlet orifices is uncovered as the area in the other of the first and second outlet orifices is covered. In an extreme position it is possible for the total flow of the inlet orifice to flow to one of the outlet orifices without being restricted.

The divider section is connected to the shuttle valve section by first and second conduits that extend from the first and second outlet orifices, respectively.

The shuttle valve section includes a piston arrangement with a first surface exposed to the fluid pressure in the first conduit and a second surface exposed to the fluid pressure in the second conduit. The piston arrangement responds to the fluid pressure by moving to allow fluid to simultaneously flow through first and second outlet ports into the first and second distribution systems in a manner as established by the position of the shaft in the divider section. Should back pressure in the first and second distribution system fluctuate, the pressure in the second bore will experience a similar change and develop a pressure differential across the piston arrangement. This pressure differential moves the piston arrangement until the pressures in the second bore acting on the piston arrangement is again equal. In this position, even though the pressure drop in one distribution system will be different, the other distribution system will have a larger flow area such that the original volumetric flow split remains substantially constant.

It is an object of this invention to provide a mechanical separation of the flow of fluid from a source into a constant percentage relationship for distribution to separate systems.

An advantage of this invention occurs since the division of the fluid from a source is achieved by the use of a divider and shuttle valve arrangement without the need for external sensing devices.

This advantage and others should become apparent from reading this specification in conjunction with the attached drawings wherein:

FIG. 1 is a sectional view of a flow control device made according to the principals of this invention; and FIG. 2 is a view taken along section 2—2 of FIG. 1, and FIG. 3 is a view of an indicator which provides an operator with a visual relationship of the division of the flow between the first and second systems; and FIG. 4 is a sectional view of the flow control device of FIG. 1 showing fluid flowing to first and second distribution systems.

FIG. 5 is a segment of the semi-cylindrical section of the splitter valve of FIG. 1 showing the entire flow diverted to a single system.

The flow system 10 through which fluid from a single source 14 is supplied to first and second distribution conduits 16 and 18 has a flow control device 12. The flow control device 12 provides for the division of the fluid in accordance with a set flow requirement. An indicator lever or knob 20, as best seen in FIG. 3, is set on a desired division for fluid flow requirements for the first and second distribution conduits 16 and 18.

The flow control device 12 has a housing 26 with a first section 22 which is a divider section and a second section 24 which is a pressure equalization section.

The housing 26 has a first bore 28 with an inlet orifice 32 that is connected to the single source of fluid 14, and first and second outlet orifices 34 and 36.

Each of the orifices 34 and 36 have the same cross-sectional area which is smaller than inlet orifice 32 such that there is a pressure differential produced as the fluid flows toward the first and second distribution conduits 16 and 18. A shaft 30 located in bore 28 has a semi-cylindrical section or slot 38 that is positioned adjacent to inlet orifice 32 and the first and second outlet orifices 34 and 36. Edges 40 and 42 engage bore 28 such that any change in the flow area of one of the first and second orifices 34 and 36 produces a corresponding but opposite change in the other. Shaft 30 is retained in bore 28 by a first snap ring 44 located in groove 43 and a second snap ring 48 located in groove 50.

The first outlet orifice 34 is connected to a second bore 52 in the pressure equalization section 24 by a first passage or conduit 54 and the second outlet orifice 36 is connected to the second bore 52 by a second passage or conduit 56.

The pressure equalization section 24 includes first and second pistons 58 and 60 which are located in the second bore 52. Pistons 58 and 60 are separated by a spring 62 which urges the pistons 50 and 60 toward stops 64 and 66 such that flanges 66 and 68 cover outlet ports 70 and 72, respectively. Each piston 58 and 60 has a plurality of axial holes 74 . . . 74" and 76 . . . 76" located in flanges 66 and 68 that allows restricted flow communication between faces 78 and 80 and 83 and 84 on the pistons 58 and 60, respectively. Sleeve 86 has shoulders 88 and 90 which limit the extent that pistons 58 and 60 may move toward each other. A passage 92 communicates a reference signal to chamber 94 formed between pistons 58 and 60 and sleeve 86. As shown in FIG. 1, spring 62 urges piston faces 78 and 82 against stops 64 and 66 to position flanges 66 and 68 over outlet ports 70 and 72.

Plugs 96 and 98 are connected to housing 26 to seal bore 52 from the surrounding environment. Stops 64 and 66 have stems 100 and 102 which extend through plugs 96 and 98, respectively, and are adjustable to assure that flanges 66 and 68 are in the correct position with respect to outlet ports 70 and 72.

While a spring 66 and reference pressure are provided to chamber 94 to establish a reference level for movement of piston 58 and 60, a bellows, not shown, could be used to establish a fixed level rather than the multiple range as with the pressure of the fluid supplied to chamber 94.

MODE OF OPERATION

As shown in FIGS. 1 and 3, the indicator lever 20 is set such that fifty percent of the flow from source 14 is directed to each distribution system 16 and 18. The semi-cylindrical surface or section 38 is such that half of the fluid from inlet orifice 32 is diverted into passage 54 through the first outlet orifice 34 and the other half is diverted into passage 56 through the second outlet orifice 36. Fluid in passage 54 is directed into chamber 57 in the second bore 52 and fluid in passage 56 is directed into chamber 59 in bore 52. The pressure of the fluid in chambers 57 and 59 acts on the effective area of pistons 58 and 60. When the pressure of the fluid in chambers 57 and 59 is large enough to overcome spring 62 and any reference pressure level in chamber 94, (as shown ambient pressure), pistons 58 and 60 move toward each other. When flanges 66 and 68 move, fluid flows through outlet ports 70 and 72 into the first and second distribution systems 16 and 18 as shown in Figure 4. Since pistons 58 and 60 are substantially identical in cross-sectional area and the same fluid pressure is presented to chambers 57 and 59, the flow of fluid through outlet ports 70 and 72 is directly dependent on the split as set by indicator lever 20.

If for some reason the back pressure in either distribution system 16 or 18 changes, a corresponding change would occur in the chamber 57 or 59. This change in pressure would develop a pressure differential across the effective area of pistons 58 and 60 causing the pistons to move in such a manner as to restrict the flow through the opposite outlet port and develop a corresponding increase in the pressure in the fluid pressure in the supply chamber associated therewith. Thus, the total volume of fluid flowing in the distribution systems 16 and 18 remains at the same percentage as set by the indicator 20.

If a fixed percentage of flow were desired, it would be possible to place fixed orifices in the inlet passage that supplies passages 54 and 56. Under these conditions, the flow area through outlet orifices would be set rather than adjustable as shown by indicator 20 in FIG. 1. However, the general application of the adjustable shaft 30 in the splitter section 20, which can move from 100 percent to passage 54 for distribution system 16 and shown in FIG. 5 through the equal percentage distribution as in FIG. 1 to a 100 percentage distribution to passage 56 connected to distribution system 18, should provide a wider application for the flow control device 10.

We claim:

1. A flow control device for supplying at least first and second fluid distribution systems with a constant percentage of fluid flowing from a single source of fluid comprising:

a housing having a first bore and a second bore, said first bore being connected to said single source of fluid through an inlet orifice and to said second bore through first and second passages that extend from first and second outlet orifices, respectively, said second bore having first and second outlet ports connected to said first and second distribution systems;

a shaft located in said first bore having a semi-cylindrical section transversely located with respect to said first and second outlet orifices for establishing said percentage of fluid flow to each of said first and second outlet orifices;

means for moving said semi-cylindrical section of said shaft such that a change in the flow area through one of said first and second orifices causes a corresponding change in the other of said first and second orifices so that the total volume of flow through said inlet orifice remains constant;

indicia on said housing to provide a reference to inform the operator of the position of said semi-cylindrical section of said shaft with respect to said first and second outlet orifices;

a first piston located in said second bore and having a first area exposed to the fluid in said first passage;

a second piston located in said second bore and having a second area exposed to the fluid in said second passage;

adjusting means located in said second bore for aligning said first and second pistons with respect to said first and second outlet ports to assure that flow from said second bore simultaneously occurs through the first and second outlet ports; and resilient means located between said first and second pistons for urging said first and second pistons toward said adjusting means, said pressure of the fluid in said second bore being required to overcome said resilient means before any flow occurs through said first and second outlet ports, said first and second pistons responding to any differences in the fluid pressure between the first and second distribution systems by moving to correspondingly change the area of flow through said first and second outlet ports such that the volume of fluid flowing through the first and second outlet ports corresponds to the percentage established by said means in said first bore.

2. The flow control device as recited in claim 1 wherein said first and second pistons include:

dampening means to provide a controlled rate of change for the movement of said first and second pistons.

3. The flow control device as recited in claim 2 further including:

a chamber located between said first and second pistons in said second bore, said chamber being connected to a fluid at a fixed pressure level to assist the resilient means in establishing a minimum pressure level for the development of fluid flow through said first and second outlet ports.

4. The flow control device as recited in claim 3 wherein said first and second outlet orifices are substantially identical in cross-sectional areas such that the entire fluid flow from the single source could be directed to either the first or second outlet orifice.

5. A flow control device for supplying at least first and second fluid distribution systems with a constant percentage of fluid flowing from a single source of fluid comprising:

a housing having a first bore and a second bore, said first bore being connected to said single source of fluid through an inlet orifice and to said second bore through first and second passages that extend from first and second outlet orifices, respectively, said second bore having first and second outlet ports connected to said first and second distribution systems;

a shaft having a semi-cylindrical section transversely located with respect to said first and second outlet orifices for establishing said percentage of fluid flow to each of said first and second outlet orifices;

means for moving said semi-cylindrical section of said shaft such that a change in the flow area through one of said first and second orifices causes a corresponding change in the other of said first and second orifices so that the total volume of flow through said inlet orifice remains constant;

a first piston located in said second bore and having a first area exposed to the fluid in said first passage;

a second piston located in said second bore and having a second area exposed to the fluid in said second passage;

adjusting means located in said second bore for aligning said first and second pistons with respect to said first and second outlet ports to assure that flow from said second bore simultaneously occurs through the first and second outlet ports; and resilient means for urging said first and second pistons toward said adjusting means, said pressure of the fluid in said second bore being required to overcome said resilient means before any flow occurs through said first and second outlet ports, said first and second pistons responding to any differences in the fluid pressure between the first and second distribution systems by moving to correspondingly change the area of flow through said first and second outlet ports such that the volume of fluid flowing through the first and second outlet ports corresponds to the percentage established by the position of the semi-cylindrical section of said shaft in said first bore.

6. The flow control device as recited in claim 5 further including:

dampening means for providing a controlled rate of change for the movement of said first and second pistons.

7. The flow control device as recited in claim 5 further including:

a chamber located in said second bore and connected to a source of fluid having a fixed pressure level, said first and second pistons extending into said chamber, said fluid pressure in said chamber being combined with the force of said resilient means to establish a minimum pressure level in said first and second passages before fluid flows from said first and second outlet ports.

8. The flow control device as recited in claim 7 wherein said first and second outlet orifices are identical in cross-sectional area with said inlet orifice such that the entire flow from said inlet orifice could be directed to either said first or second passage with a reduction in the volume of fluid flow.

9. The flow control device as recited in claim 8 further including:

indicia on said housing to provide a reference to inform an operator of the position of said semi-cylindrical second on said shaft with respect to said first and second outlet orifices and thereby provide a visual indication of the flow relationship of fluid to the first and second distribution systems.

* * * * *